United States Patent [19]

Nakazima et al.

[11] 4,436,764

[45] Mar. 13, 1984

[54] METHOD AND APPARATUS FOR SURFACE-HARDENING TREATMENT OF SYNTHETIC RESIN SHAPED ARTICLES

[75] Inventors: Atushi Nakazima; Mitisuke Edamatsu; Kenji Kushi, all of Otake, Japan

[73] Assignee: Mitsubishi Rayon Company, Ltd., Tokyo, Japan

[21] Appl. No.: 400,588

[22] Filed: Jul. 21, 1982

[30] Foreign Application Priority Data

Jul. 28, 1981 [JP] Japan ................................. 56-118756

[51] Int. Cl.³ ............................................. B05D 3/06
[52] U.S. Cl. ................................... 427/54.1; 118/423; 118/428; 118/620; 427/430.1
[58] Field of Search .................... 427/44, 54.1, 430.1; 118/423, 428, 620

[56] References Cited

U.S. PATENT DOCUMENTS

| | | | |
|---|---|---|---|
| 2,639,687 | 5/1953 | Ryan et al. | 118/428 |
| 2,728,686 | 12/1955 | Borushko | 118/423 |
| 3,837,795 | 9/1974 | Becker et al. | 118/423 |
| 3,956,540 | 5/1976 | Laliberte et al. | 118/425 |
| 4,273,799 | 6/1981 | Kamada et al. | 427/430.1 |
| 4,341,817 | 7/1982 | Tozier et al. | 427/54.1 |
| 4,345,546 | 8/1982 | Weber | 118/423 |

FOREIGN PATENT DOCUMENTS

544861  2/1932  Fed. Rep. of Germany ...... 118/423

Primary Examiner—John H. Newsome
Attorney, Agent, or Firm—Oblon, Fisher, Spivak, McClelland & Maier

[57] ABSTRACT

Method and apparatus for the surface-hardening treatment of a synthetic resin shaped article is provided, wherein the shaped article is dipped in a surface-hardening solution; the shaped article is gradually pulled up therefrom thereby to be coated with the surface-hardening solution; and the coated article is irradiated with ultraviolet rays to cure the coating. The shaped article is dipped in succession in a washing tank, a drying tank having warm water or an organic solvent and a hardening solution tank while the shaped article is conveyed by a first conveyor, and then, the shaped article is transferred from the first conveyor through an intermediate conveyor to a second conveyor whereby the shaped article is conveyed to an ultraviolet ray-curing step. The shaped article is introduced to and withdrawn from the respective steps in the state where the shaped article is hung on a hanger, and one or a plurality of hangers are attached to each of a plurality of portions of the first conveyor so that the shaped articles are simultaneously subjected to the dipping treatment in the respective tanks, whereas the hangers are conveyed one by one from the intermediate conveyor to the second conveyor where the shaped articles are separately hung. In each of the tanks, organic solvent and the hardening solution tank, the liquid is overflowed therefrom and circulated via a filter to each tank. The surface-hardening treatment is carried out under such conditions that the hardening solution and the atmosphere above the hardening solution tank are maintained at room temperature and the dew point of said atmosphere is maintained at least 3° C. lower than the temperature of the hardening solution.

10 Claims, 6 Drawing Figures

METHOD AND APPARATUS FOR SURFACE-HARDENING TREATMENT OF SYNTHETIC RESIN SHAPED ARTICLES

BACKGROUND OF THE INVENTION (1) Field of the Invention

This invention relates to a method for the surface-hardening treatment of a synthetic resin shaped article and an apparatus for use in carrying out said method.

(2) Description of the Prior Art

Synthetic resins excellent in molding processability and impact resistance are used in various fields. However, most synthetic resins have problems such that the surfaces of shaped articles of these synthetic resins are not hard, are readily marred, and if mars and scratches are formed on the surfaces, the commercial values of the shaped articles are reduced. These problems are serious particularly in optically transparent materials such as lenses and light-transmitting transparent materials such as lamp lenses. It has, therefore, eagerly been desired to impart a scratch resistance to the surfaces of shaped articles.

A method has been proposed and adopted in which a silicone type cured coated film is formed on the surface of a shaped article to improve the surface hardness. As means for forming a uniform coating of a cured film, U.S. Pat. Nos. 3,956,540 and 4,036,168 disclose a method and apparatus for hardening the surface of a shaped article by applying a fluoroethylene polysilicate polymer as the surface-hardening liquid onto the surface of the shaped article. The hardening solution used in this conventional technique is cured by application of heat, and the curing must be carried out in two stages, namely, after the pre-curing step, the surface of the shaped article of a tack-free state must be further treated in the subsequent curing step for imparting thereto the desired mar or abrasion resistance.

Research was made in view of obtaining a synthetic resin shaped article having enhanced surface hardness and abrasion resistance by a method wherein a hardening solution curable with ultraviolet rays is applied onto the surface of a synthetic resin shaped article and whereby a uniform coating can be formed and the coating can be cured in a single curing step. As a result, the following facts were understood.

When a hardening solution is applied onto the surface of a synthetic resin shaped article, spittings, cissings or pinholes are readily caused, and in order to obtain a treated article excellent in the surface smoothness, it is necessary to circulate and filter the hardening solution to be coated on the surface so as to sufficiently remove solids and foreign substances from the hardening solution. Moreover, it is also necessary to clean the surface of an article to be treated by a preliminary treatment.

Furthermore, it is necessary to maintain a dust-free clean state in the atmosphere throughout the surface-hardening treatment zone, and it often is necessary to control the temperature and humidity of the atmosphere. Otherwise, such defects as unevenness of the thickness, whitening and orange peel are caused on the coating film by irregular evaporation speed or condensation of water on the coating surface. Moreover, the smoothness or hardness of the cured film is influenced by the period of from the point of coating of the hardening solution to the point of curing by irradiation with ultraviolet rays.

SUMMARY OF THE INVENTION

Therefore, it is the primary object of the present invention to provide synthetic resin shaped articles having a uniform surface coating of excellent abrasion resistance and surface hardness, which coating can be produced in a single curing step.

In one aspect of the present invention, there is provided a method for the surface-hardening treatment of a synthetic resin shaped article wherein a synthetic resin shaped article is dipped in a surface-hardening solution; the synthetic resin shaped article is gradually pulled up therefrom thereby being coated with the surface-hardening solution; and the coated shaped article is irradiated with ultraviolet rays to cure the coating, CHARACTERIZED IN THAT (a) the synthetic resin shaped article is dipped in succession in a washing pretreatment tank, a drying tank having warm water or an organic solvent and a hardening solution tank while the synthetic resin shaped article is conveyed by a first conveyor, and then, the synthetic resin shaped article is transferred from the first conveyor through an intermediate conveyor to a second conveyor whereby the synthetic resin shaped article is conveyed to an ultraviolet ray-curing step; (b) the synthetic resin shaped article is introduced to and withdrawn from the respective steps in the state where the synthetic resin shaped article is hung on a hanger, and one or a plurality of hangers are attached to each of a plurality of portions of the first conveyor so that the synthetic resin shaped articles are simultaneously subjected to the dipping treatment in the respective tanks, whereas the hangers are conveyed one by one from the intermediate conveyor to the second conveyor where the synthetic resin shaped articles are separately hung; (c) in each of the washing pretreatment tank, the drying tank comprising warm water or an organic solvent and the hardening solution tank, the liquid is overflowed therefrom and circulated via a filter to each tank; and (d) the surface-hardening treatment is carried out under such conditions that the surface-hardening solution in the hardening solution tank and the atmosphere above the hardening solution tank are maintained at room temperature, and the dew point of said atmosphere is maintained at a level lower by at least 3° C. than the temperature of the surface-hardening solution.

In another aspect of the present invention, there is provided an apparatus for the surface-hardening treatment of a synthetic resin shaped article by dipping a synthetic resin shaped article in a surface-hardening solution, gradually pulling up the synthetic resin shaped article to coat the surface of the synthetic resin shaped article with the surface-hardening solution and irradiating the coated shaped article with ultraviolet rays to cure the coating, said apparatus comprising (a) a conveyor system including a first conveyor for conveying the synthetic resin shaped article in succession through a washing pretreatment tank, a drying tank, and a hardening solution tank to effect dipping in the respective tanks, a second conveyor for conveying the synthetic resin shaped article to an ultraviolet ray-curing device, and a intermediate conveyor for transferring secondary hangers each having the synthetic resin shaped article hung thereon from the first conveyor to the second conveyor; one or more of said secondary hangers each having the synthetic resin shaped article hung thereon being detachably attached to each of a plurality of primary hangers attached to the first conveyor; and said secondary hangers being conveyed separately and one by one from the first conveyor through the intermediate conveyor to the second conveyor whereby the secondary hangers are conveyed one by one to the ultraviolet ray-curing device; (b) pumps for circulating the liquids through pipe lines from the washing pretreatment tank, drying tank and hardening solution tank to the respective tanks, and filters arranged downstream of said pumps in the respective circulating pipe lines; (c) a device surrounding the respective conveyors, and the washing pretreatment tank, the drying tank, the hardening solution tank, and the ultraviolet ray-curing device to define a substantially closed treating chamber; and (d) a device including an air feeder for feeding air into the treating chamber, a filter for removing dusts from the air in the treating chamber, and a heat exchanger for adjusting the temperature and humidity of the air in the treating chamber.

DESCRIPTION OF THE PREFERRED EMBODIMENTS

A synthetic resin shaped article to be treated (hereinafter referred to as "shaped article" for brevity) is hung on a hanger and conveyed to a washing pretreatment zone where it is dipped in a washing liquid to effect surface washing and is then pulled up therefrom. The washing zone comprises at least one washing tank charged with the washing liquid. An appropriate washing liquid is selected and used according to the material and shape of the shaped article. An aqueous solution containing a neutral detergent or an aqueous alkaline solution containing an inorganic salt of sodium or potassium and/or an organic salt is preferably used. After the shaped article has been pulled up, it is promptly delivered by a first conveyor to a drying zone comprising a drying tank charged with warm water or an organic solvent (hereinafter referred to as "drying tank" for brevity) before its surface is dried, and then in the wet state it is dipped in the drying tank. By gradually and gently pulling up the shaped article from the drying tank, water adhering to the surface of the shaped article is removed and its surface is dried. Warm water or an organic solvent is used for the drying tank. When warm water is used, it is preferred that the temperature of warm water be adjusted to 30° C. to 80° C. If the temperature of warm water is lower than 30° C., a long time is required for removing adhering water by drying. If the temperature of warm water is higher than 80° C., there is a risk of a detrimental inflence on the material of the shaped article. When the organic solvent is used, an organic solvent having a boiling point of lower than 100° C., such as methanol, ethanol, isopropyl alcohol, acetone, methyl ethyl ketone, or cyclohexane is preferably used.

The surface-dried shaped article is delivered by the first conveyor to a coating zone for coating it with a surface-hardening solution (hereinafter referred to as "hardening solution" for brevity), where it is then dipped in the hardening solution and pulled up therefrom.

In the present invention, a cooling zone may be disposed downstream of the drying zone but upstream to the hardening solution-coating zone. When the temperature of warm water in the drying tank is high, it is preferred that a cooling zone be disposed to cool the shaped article. In this case, the shaped article is cooled to a temperature lower than the level of the temperature of the hardening solution plus 20° C., and then, it is dipped in the hardening solution. The hardening solution in the coating or hardening solution tank and the atmosphere above the hardening solution are maintained at room temperature of 10° C. to 30° C., and the dew point of air in said atmosphere is maintained at a level lower by at least 3° C. than the temperature of the hardening solution. If the temperature of the atmosphere above the hardening solution is lower than 10° C., the viscosity of the hardening solution is increased. In contrast, if this temperature is higher than 30° C., deterioration of the hardening solution is accelerated. If the dew point of air above the hardening solution exceeds the level of the temperature of the hardening solution minus 3° C., the condensation of water in air caused by reduction of the temperature of the coating due to evaporation of the solvent from the coating surface, results in formation of orange peel on the coating surface. In the present invention, it is preferred that an ultrasonic washing device be arranged on the bottom or side face of each of the washing pretreatment tank, drying tank and hardening solution tank. When an ultrasonic washing device is attached to the hardening solution tank, cavitation bubbles formed by this device smoothly remove dusts and other foreign substances from the surface of the shaped article and occurrence of spitting or the like on the surface can be prevented. Furthermore, disposition of an ultrasonic washing device is effective for removing an air layer carried into the liquid in each tank in the state adhering to the surface of the shaped article. The intensity of ultrasonic waves used is 0.2 to 5 watt/cm$^2$, and the relative intensity to the liquid volume is preferably 10 to 100 watts/l.

The number of the hangers for use in hanging the shaped article in the treatment tank through each of the foregoing steps is not limited to one, but a plurality of hangers may be attached according to the treatment capacity to each of a plurality of primary hangers attached to the first conveyor. In the hardening solution tank alone or both the hardening solution tank and the drying tank, the hangers may be pulled up therefrom independently from the first conveyor by a lifting device.

It is preferred that an air feed and exhaust system be attached to the apparatus for use in carrying out the method of the present invention so that air from which dusts have been removed and in which the temperature and humidity have been adjusted can be fed to the hardening solution tank zone where dusts and the like should be completely avoided and air can be allowed to flow from the hardening solution tank zone to the washing pretreatment tank through the drying tank, whereby the surface of the shaped article can be prevented from being contaminated by dust and the like.

The hardening solution used in the present invention preferably consists of a coating composition comprising a monomer mixture containing at least 30% by weight of a monomer having in the molecule at least three acryloyloxy or methacryloyloxy groups as crosslinkable unsaturated groups and an organic solvent optionally with additives imparting various properties, such as antistatic agent and a dyeing aid. As the monomer having in the molecule at least three acryloyloxy or methacryloyloxy groups, monomers represented by the following general formula [I]:

can be mentioned, wherein n is 0 or an integer of from 1 to 4, at least 3 of the groups X are $CH_2=CH-COO-$ or $CH_2=C(CH_3)COO-$ groups and the remaining groups X are —OH groups. The monomers of the formula [I] include, for example, pentaerythritol trimethacrylate, pentaerythritol triacrylate, pentaerythritol tetramethacrylate, pentaerythritol tetraacrylate, dipentaerythritol trimethacrylate, dipentaerythritol triacrylate, dipentaerythritol tetramethacrylate, dipentaerythritol tetraacrylate, dipentaerythritol pentamethacrylate, dipentaerythritol pentaacrylate, dipentaerythritol hexamethacrylate, dipentaerythritol hexaacrylate, tripentaerythritol trimethacrylate, tripentaerythritol triacrylate, tripentaerythritol tetramethacrylate, tripentaerythritol tetraacrylate, tripentaerythritol pentamethacrylate, tripentaerythritol pentaacrylate, tripentaerythritol hexamethacrylate, and tripentaerythritol hexaacrylate.

In order to improve the properties of the hardening solution, up to 60% by weight of a bifunctional methacrylate or acrylate monomer represented by the following general formula [II]:

wherein $R_1$ stands for a hydrogen atom or a methyl group, $X_1$ through $X_n$, which may be the same or different, stand for an alkylene group having up to 6 carbon atoms in which one hydrogen atom may be substituted by a hydroxyl group, and n is an integer of from 0 to 5, may be included in the monomer mixture.

As the bifunctional monomer represented by the general formula [II], there can be mentioned, for example, 2,2-bis(4-acryloxyphenyl)propane, 2,2-bis(4-methacryloxyphenyl)propane, 2,2-bis(4-acryloxyethoxyphenyl)propane, 2,2-bis(4-methacryloxyethoxyphenyl)propane, 2,2-bis(4-acryloxyethoxyphenyl)propane, 2,2-bis(4-methacryloxyethoxyphenyl)propane, 2,2-bis(4-acryloxydiethoxyphenyl)propane, 2,2-bis(4-methacryloxydiethoxyphenyl)propane, 2,2-bis(4-acryloxypropoxyphenyl)propane, -2,2-bis(4-methacryloxypropoxyphenyl)propane, 2,2-bis[4-acryloxy(2-hydroxypropoxy)phenyl]propane, 2,2-bis[4-methacryloxy(2-hydroxypropoxy)phenyl]propane, 2,2-bis[4-acryloxy(2-hydroxypropoxyethoxy)phenyl]propane, and 2,2-bis[4-methacryloxy(2-hydroxypropoxyethoxy)phenyl]propane.

When a monomer having in the molecule up to two methacryloyloxy or acryloyloxy groups and having a boiling point of at least 150° C. at normal pressure and a viscosity lower than 20 cp at 20° C. (hereinafter referred to as "monomer [III]" for brevity) is incorporated in the hardening solution, the surface smoothness, flexibility, and adhesion of the cured coating to the shaped article are improved.

As preferred examples of the monomer [III], there can be mentioned diethylene glycol dimethacrylate, diethylene glycol diacrylate, triethylene glycol dimethacrylate, triethylene glycol diacrylate, tetraethylene glycol dimethacrylate, dipropylene glycol dimethacrylate, dipropylene glycol diacrylate, 2-hydroxyethyl methacrylate, 2-hydroxyethyl acrylate, 2-hydroxypropyl methacrylate, 2-hydroxypropyl acrylate, glycidyl methacrylate, glycidyl acrylate, tetrahydrofurfuryl methacrylate, tetrahydrofulfuryl acrylate, ethoxyethyl methacrylate, ethoxyethyl acrylate, ethylcarbitol methacrylate, ethylcarbitol acrylate, butoxyethyl methacrylate, butoxyethyl acrylate, 1,4-butylene glycol monomethacrylate and 1,4-butylene glycol monoacrylate. These compounds have a hydroxyl group, and/or a cyclic ether linkage, and/or a linear ether linkage on the side chain of the monomer or between two methacyloyloxy or acryloyloxy groups, and they exhibit good polymerization activity. The monomer [III] is used in an amount of up to 70% by weight in the monomer mixture.

In order to initiate the polymerization smoothly by irradiation with ultraviolet rays, it is preferred that a photo-sensitizer be incorporated in the hardening solution in advance. As the photo-sensitizer, there can be mentioned, for example, carbonyl compounds such as benzoin, benzoin methyl ether, benzoin ethyl ether, benzoin pyopyl ether, acetoin, butyroin, toluoin, benzil, benzophenone, p-chlorobenzophenone, and p-methoxybenzophenone; sulfur compounds such as tetramethyl thiuram monosulfide, and tetramethyl thiuram disulfide; azo compounds such as azobisisobutyronitrile and azobis-2,4-dimethylvaleronitrile; and peroxide compounds such as benzoyl peroxide and di-t-butyl peroxide.

The photo-sensitizer is incorporated in an amount of up to 10 parts by weight, preferably 0.01 to 10 parts by weight, per 100 parts by weight of the monomer mixture or the sum of the monomer mixture and the organic solvent.

The organic solvent is used for controlling the viscosity of the hardening solution and forming a uniform coating. According to the desired conditions of the surface coating to be formed, a solvent may appropriately be selected from alcohols such as ethanol, isopropanol, n-propanol, isobutyl alcohol, and n-butyl alcohol; aromatic hydrocarbons such as benzene, toluene, xylene and ethylbenzene; ketones such as acetone and methylethyl ketone, ethers such as dioxane; esters such as ethyl acetate, n-butyl acetate and propionic acid esters; and amides such as N,N'-dimethyl formamide. Furthermore, polymerizable monomers such as methyl acrylate, ethyl acrylate and methyl methacrylate may be used according to need.

The organic solvent is used in an amount of 10 to 95 parts by weight per 90 to 5 parts by weight of the monomer mixture. If the amount of the organic solvent is smaller than 10 parts by weight, the viscosity is high and the working properties of the hardening solution in coating operation are poor. If the amount of the organic solvent exceeds 95 parts by weight, the surface smoothness of the resulting coating is degraded.

Figure 5:
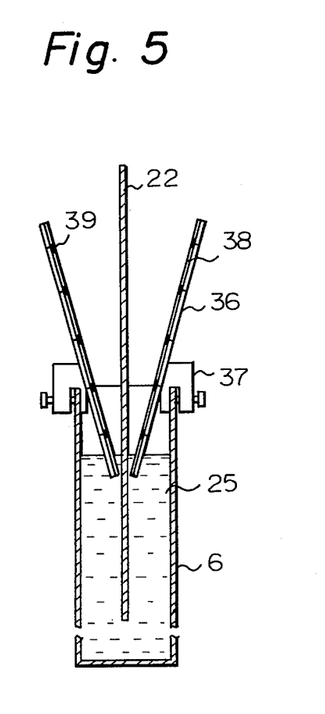
FIG. 5 and 6 illustrate an embodiment in which plate-like shaped articles dipped in a liquid tank provided with guides arranged to guide these plate-like shaped articles into the tank.
Figure 6:
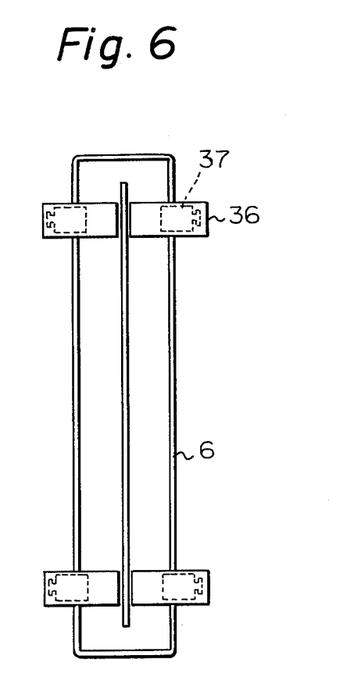

The shape of the shaped article used in the present invention is not particularly critical, but either a plate-like shaped article or a shaped article having a complicated shape including convexities and concavities may be treated according to the present invention. When a plate-like shaped article is treated, as is shown in FIGS. 5 and 6 one pair or a plurality of pairs of guides may preferably arranged in the liquid surface portion of the hardening solution tank so that the top ends of the guides are immersed in the hardening solution, and the guides are tapered toward the bottom of the tank, whereby a uniform coating surface can be formed.

As the shaped article to be treated according to the present invention, there can be mentioned, for example, sheet-like shaped articles, rod-like shaped articles and injection-molded articles, which are prepared from thermoplastic resins such as poly(methyl methacrylate) resins, methyl methacrylate copolymer resins, polycarbonate resin, poly(allyl diglycol carbonate) resins, polystyrene resins, acrylonitrile/styrene copolymer resins (AS resins), poly(vinyl chloride) resins, acetate resins, ABS resins, and polyester resins. Among these shaped articles, those prepared from poly(methyl methacrylate) resins, methyl methacrylate copolymer resins, polycarbonate resin, and poly(allyl diglycol carbonate) resins are popularly used for effectively utilizing their excellent optical properties, heat resistance, and impact resistance, and in these shaped article, improvement of the abrasion resistance is eagerly desired. Accordingly, these shaped articles are preferably treated in the present invention.

The amount of the hardening solution to be coated on the surface of the shaped article may be varied depending upon the amount of the monomer mixture contained in the coating composition and the intended objects. However, it is ordinarily necessary that the hardening solution be coated in such an amount that the thickness of a cured coating formed on the surface of synthetic resin shaped article is in the range of from 1 to 30 microns. If the thickness of the cured coating formed on the surface of the shaped article is smaller than 1 micron, the abrasion resistance is poor. If the thickness of the cured coating exceeds 30 microns, the flexibility of the cured coating is degraded and cracks are readily formed.

The shaped article coated with the hardening solution is hung on the hanger and is conveyed to the ultraviolet ray-irradiating zone by the second conveyor through the intermediate conveyor, and in this zone, the coating is cured. More specifically, in the ultraviolet ray-irradiating zone, a metal halide lamp, a low-pressure mercury lamp, a high-pressure mercury lamp or an ultra-high-pressure mercury lamp is used, and the hardening solution-coated surface is irradiated with ultraviolet rays to effect curing. It is necessary that the period of from the point of coating of the hardening solution to the point of curing with ultraviolet rays be 30 seconds to 6 minutes, preferably 1 to 4 minutes. If this period is too short, since a large amount of the solvent is left in the coating, whitening is readily caused or the hardness becomes poor. Furthermore, in this case, unevenness of thickness is caused. If the above-mentioned period is too long, the opportunity of the coating to have contact with dust is increased and spitting is readily caused. If the above period is extremely long, the adhesion of the cured coating is reduced.

Irradiation with ultraviolet rays may be carried out in an atmosphere of an inert gas such as nitrogen gas or carbon dioxide gas, or in an air atmosphere. The temperature of the irradiation atmosphere may be room temperature or an elevated temperature not causing undesirable deformation of the shaped article.

The apparatus of the present invention will now be described in detail with reference to the accompanying drawings.

Figure 1:
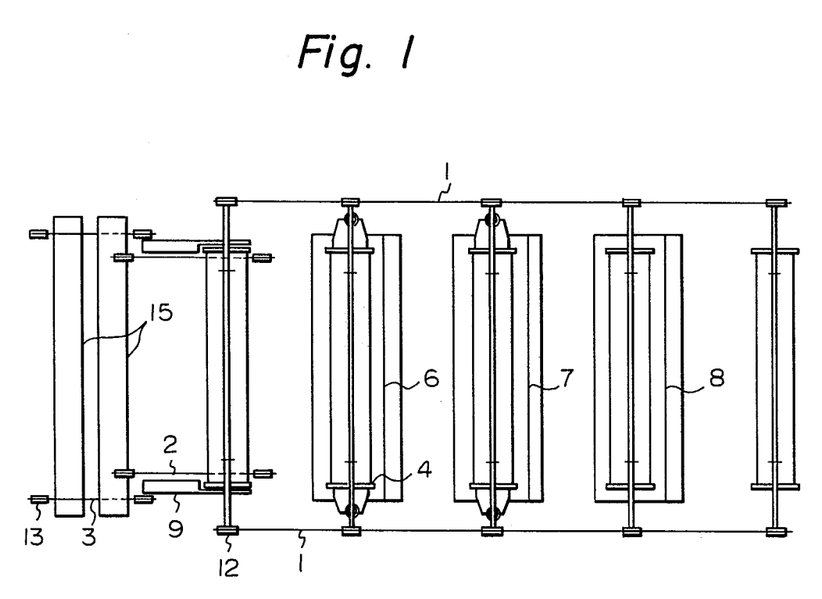
FIGS. 1 and 2 are plan and sectional side views, respectively, illustrating the outline structure of the surface-hardening treatment apparatus of the present invention.
Figure 2:
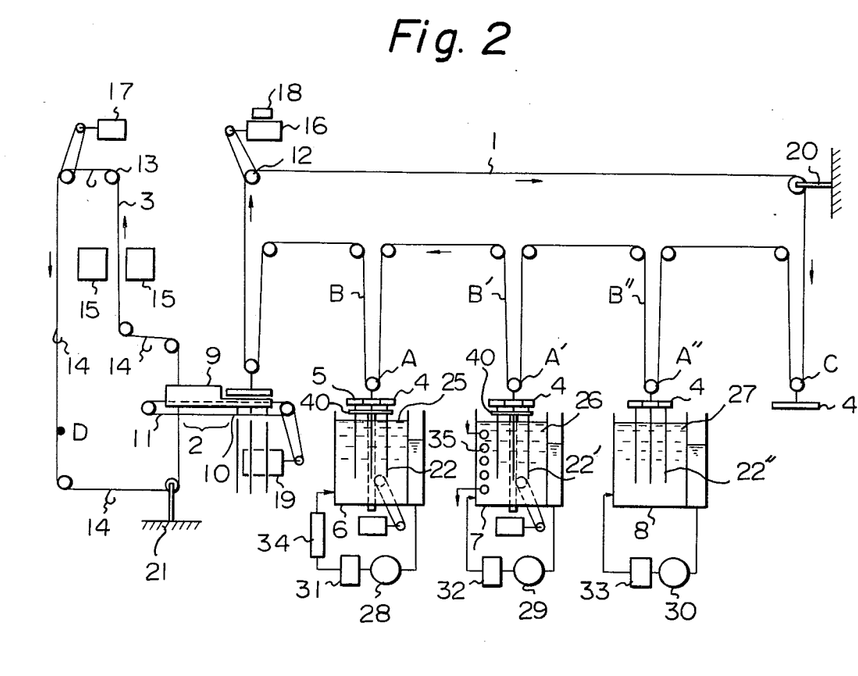

Referring to FIGS. 1 and 2, primary hangers 4 are rotatably hung on a first chain conveyor 1 turned and moved along sprockets 12, and are arranged at such intervals that when charging of a shaped article 22 in a hardening solution tank 6 is completed, charging of shaped articles 22' and 22" in a washing pretreatment tank 7 and a drying tank 8, respectively, is concurrently completed. The first chain conveyor 1 is arranged so that it is moved at a low pull-up speed from the pull-up-starting points A, A' and A" to the pull-up-ending points B, B' and B" and at a speed higher than the pull-up speed in other portions. This changeover of speed is performed by a clutch mechanism to be actuated by a signal from a limit switch of the first chain conveyor 1.

One or a plurality of secondary hangers 5 are attached to each primary hanger 4, and a shaped article 22 is attached to each secondary hanger 5. When the primary hanger 4 is placed on the right side portion of a loading rail 9 of an intermediate conveyor 2, the secondary hangers 5 attached to the primary hanger 4 are separated from the primary hanger 4 by a chain conveyor 11 having hooks 10 and shifted to the left side of the loading rail 9.

Hooks 14 are rotatably attached at appropriate intervals to a second chain conveyor 3 turned and moved along sprockets 13. The secondary hangers 5 delivered on the loading rail 9 are hung one by one on the hooks 14 of the second chain conveyor 3 by the intermediate conveyor 2 and transported to an ultraviolet ray-irradiating device 15.

The primary hanger 4 from which the secondary hangers 5 have been separated by the intermediate conveyor 2 is returned to the point C where the primary hanger 4 stands by for receipt of subsequent secondary hangers, each having a shaped article hung thereon.

The shaped articles which have been dried and cured through the ultraviolet ray-irradiating device 15 are individually withdrawn at the point D together with the secondary hangers.

Reference numerals 16 and 17 represent driving mechanisms for driving the first chain conveyor 1 and the second chain conveyor 3, respectively, and reference numeral 18 represents a speed change gear unit for moving the first chain conveyor 1 at a high speed, stopping it and moving it at a low speed. Reference numeral 19 represents a driving mechanism for driving the chain conveyor 11 of the intermediate conveyor 2. The driving mechanism 19 is actuated on receipt of a signal of stoppage of the first chain conveyor 1 to separate the secondary hangers 5 from the primary hanger 4, and furthermore, the driving mechanism 19 is actuated by a signal from the second chain conveyor 3 to hang the secondary hangers 5 one by one on the second conveyor 3 so that the hung shaped articles do not interfere with one another in the second chain conveyor 3. One pair or a plurality of confronting ultraviolet ray lamps may be used as the ultraviolet ray-irradiating device 15.

Each of the hardening solution tank 6, drying tank 7 and washing pretreatment tank 8 has a liquid-overflowing structure. A hardening solution pump 28, a drying liquid pump 29 and a washing pretreatment liquid pump 30 are arranged in circulating pipe lines, and filters 31, 32, and 33 are arranged downstream of the pumps 28, 29, and 30, respectively.

In order to adjust the temperature of the hardening solution and heat the drying liquid, heat exchangers may be arranged in the circulating pipe lines or the respective tanks. In the embodiment shown in FIG. 2, a heat exchanger 34 is arranged in the circulating pipe line for the hardening solution to adjust the temperature of the hardening solution, and a heat exchanger 35 is arranged in the drying tank to adjust the temperature of the drying liquid.

Figure 3:
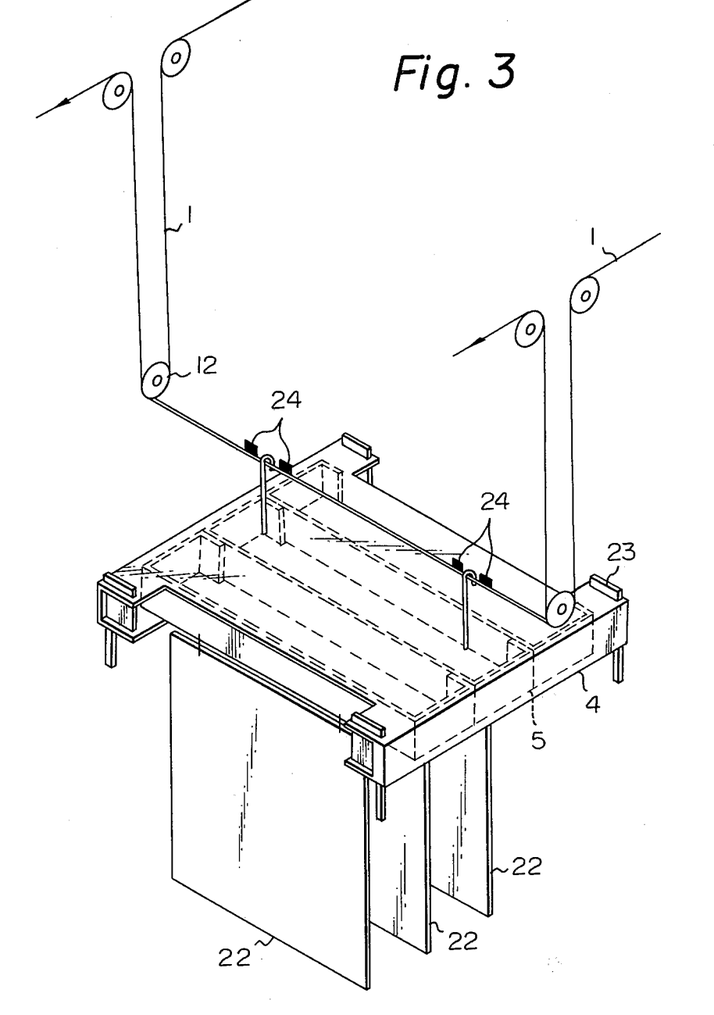
FIG. 3 is a perspective view illustrating an embodiment in which secondary hangers having shaped articles hung thereon are attached to the first hanger.

FIG. 3 illustrates the state where the secondary hangers 5 are attached to the primary hanger 4. The secondary hangers 5 have an L-shaped structure, and shaped articles 22 are hung at certain intervals on the secondary hangers 5. Cotters 23 are arranged so that the secondary hangers 5 are held and prevented from falling even while the primary hanger 4 is moved. When the primary hangers 4 are placed on the loading rail 9, the cotters 23 are moved upward so that the secondary hangers are allowed to freely move in the grooves of the primary hanger 4. Accordingly, separation of the secondary hangers 5 from the primary hanger 4 becomes possible. In the embodiment shown in FIG. 3, three secondary hangers 5 are attached to the primary hanger 4. However, the number of secondary hangers attached to the primary hanger is not limited to 3.

Figure 4:
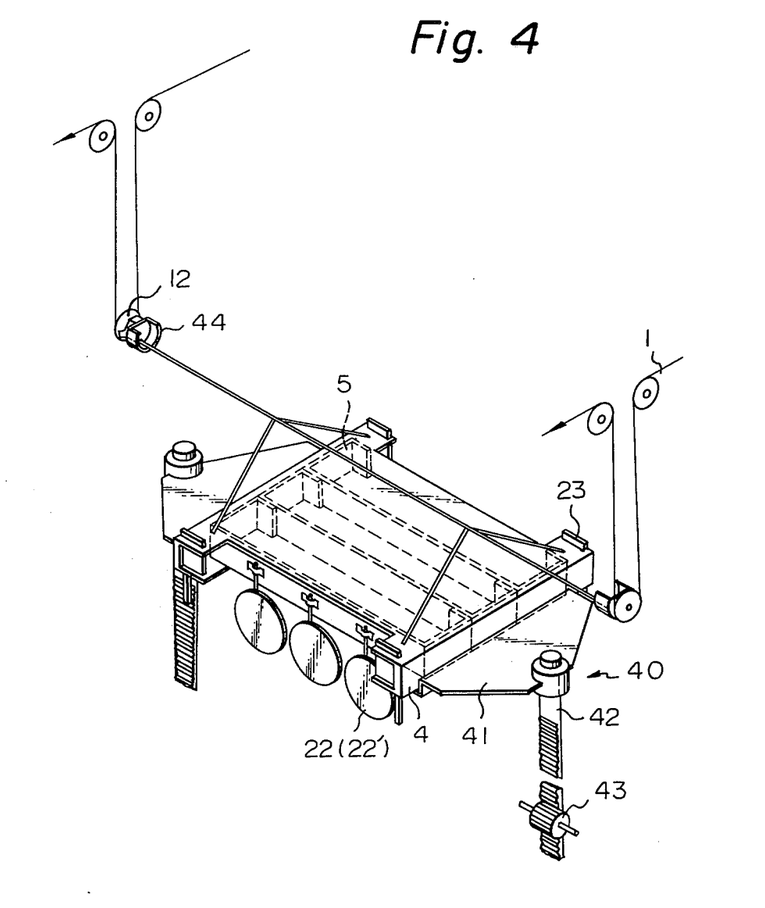
FIG. 4 is a perspective view illustrating an embodiment in which the primary hanger is separated from the first chain conveyor and is pulled up by the lifting device.

FIG. 4 illustrates an emodiment in which in the hardening solution tank 6 or in both the hardening solution tank 6 and the drying tank 7, a lifting device 40 is used instead of the first chain conveyor 1 for pulling up the shaped articles 22 and 22' from the respective tanks. When the number of secondary hangers 5 to be attached to the primary hanger 4 is large or the shaped articles are optical articles such as lenses, this embodiment is preferably adopted because the pull-up operation can be performed gently and quietly.

In the embodiment illustrated in FIG. 4, the primary hanger 4 is hung on the first chain conveyor 1 through dismountable hooks 44 and is immersed in the respective liquid tanks in this state. When the first chain conveyor 1 is located at the lowermost position, the primary hanger 4 is placed on an arm 41 of the lifting device 40. In this state, the first chain conveyor 1 is stopped, and by the rising movement of the lifting device 40, the primary hanger 4 is separated from the hooks 44 and pulled up, and the surface of the shaped article is coated with the hardening solution. When the pull-up operation by the lifting device 40 is completed, the first chain conveyor 1 is moved again, and the primary hanger 4 is hung on the hooks 44 again and delivered in this state. The vertical movement of the lifting device 40 may be performed by a screw mechanism, a rack-pinion mechanism or a pneumatic or hydraulic system. In the embodiment shown in FIG. 4, the lifting device 40 is moved upward and downward by a rack 42 moved upward and downward by a pinion 43. In the present embodiment where the lifting device is used independently from the first chain conveyor, the speed of the first chain conveyor need not be changed over in two stages of the high and low speeds as in the foregoing embodiments.

FIGS. 5 and 6 illustrate an embodiment in which plate-like shaped articles are treated and guides are disposed in the hardening solution tank. Confronting guides 36 for guiding shaped articles are secured to the upper portion of the hardening solution tank 6 through attaching members 37 so that the guides 36 are arranged on both the sides of the shaped articles 22. Sliding members 38 are secured to the guides 36 through anchor bolts 39. The distance between confronting guides 36 is gradually narrowed toward the hardening solution in the hardening solution tank 6, and the lower top ends of the guides 36 are extended below the level of the hardening solution while leaving a space allowing the passage of the shaped article 22 therebetween. Accordingly, the top end portions of the guides 36 in the hardening solution act as the fixing points to the swinging movement of the shaped article 22, and therefore, the swinging movement of the shaped article on the liquid level is substantially controlled.

The sliding member 38 is preferably composed of a coating or inert material having good slip characteristics, for example, polytetrafluoroethylene, polyethylene, titanium, or porcelain. In the present invention, however, since the point of contact between the sliding member 38 and the shaped article 22 is below the level of the hardening solution, the hardening solution is always interposed between the sliding member 38 and the shaped article 22. Hence, the precision of the finished surface of the sliding member 38 need not be so enhanced. The guides 36 for guiding the shaped articles may be composed solely of a material having good sliding characteristics.

Since the guides 36 used in the apparatus of the present invention are expanded upward in the hardening solution tank 6, they exert an effect of facilitating insertion of the shaped articles 22 in the hardening solution tank 6, and they are especially effectively used for a hardening solution tank having a narrow opening.

A shaped article having a crosslinked and cured coating on the surface thereof, which is obtained according to the present invention, has an excellent surface smoothness and appearance, and it has very high surface hardness, abrasion resistance, and scratch or mar resistance. Furthermore, the crosslinked and cured coating formed on the surface of the shaped article according to the present invention is uniform and excellent in the adhesion to the shaped article substrate, and separation or cracking is not caused in the coating even under severe conditions or environments. Therefore, the present invention is very valuable and effective for the surface-hardening treatment of organic window panes, illuminating device covers, reflection mirrors, mirrors, spectacle lenses, sun-glass lenses, optical lenses, and automobile parts such as bumpers.

The present invention will now be described in detail with reference to the following Examples.

Incidentally, the apparatus shown in FIGS. 1, 2 and 3 was used in Example 1, and the apparatus shown in FIGS. 1, 2 and 4 was used in Example 2.

Example 1

A hardening solution comprising 10 parts by weight of dipentaerythritol hexaacrylate, 15 parts by weight of dipentaerythritol pentaacrylate, 5 parts by weight of dipentaerythritol tetraacrylate, 10 parts by weight tetrahydrofurfuryl acrylate, 30 parts by weight of isopropyl alcohol, 30 parts by weight of toluene, and 2 parts by weight of benzoin ethyl ether was charged in the hardening solution tank 6. A 0.3% aqueous solution of a commercially available neutral detergent was charged in washing treatment tank 8. Furthermore, warm water maintained at 40° C. was charged in the drying tank 7. The liquid in each tank was circulated and filtered while overflowing.

Confronting high-pressure mercury lamps of 5 KW were arranged as the ultraviolet ray-irradiating device 15 on the respective sides to irradiate both the surfaces of the shaped article with ultraviolet rays.

Uniform methacrylic resin sheets having a thickness of 2 mm were hung on the delivery conveyor of the above dip-coating apparatus, subjected to the washing treatment and drying treatment, dip-coated with the hardening solution and then irradiated with ultraviolet rays to effect curing of the coating. In each tank, the speed of pulling up the sheets was adjusted to 1.2 cm/sec, and that of the second conveyor 3 was 6 cm/sec. for curing the coating on the resin sheets. The period of from the point of completion of the operation of pulling up the coated sheets to the point of start of irradiation with ultraviolet rays was 1 minute and 50 seconds.

When the treatment was carried out at a hardening solution temperature of 20° C., a hardening solution atmosphere temperature of 25° C. and a relative humidity of 54% (dew point=15° C.), a crosslinked and cured coating which was excellent in the appearance and smoothness was formed on the surface of the sheet.

When the treatment was carried out under the same conditions as described above except that the relative humidity of the hardening solution atmosphere was elevated to 75% (dew point=20° C.), orange peel was formed and no good appearance was obtained.

Example 2

A hardening solution comprising 20 parts by weight of dipentaerythritol pentaacrylate, 10 parts by weight of dipentaerythritol tetraacrylate, 10 parts by weight of tetrahydrofurfuryl acrylate, 30 parts by weight of isopropyl alcohol, 15 parts by weight of isobutyl alcohol, 15 parts by weight of toluene and 2 parts by weight of benzoin ethyl ether was charged in the hardening solution tank 6, and trichloroethylene was charged in the washing pretreatment tank 8 and ethanol was charged in the drying tank 7. In each tank, the liquid was circulated and filtered while overflowing. The liquid temperatures of the hardening solution tank 6, drying tank 7 and washing pretreatment tank 8 were maintained at 23° C., 35° C. and 45° C., respectively. In each liquid tank, ultrasonic vibrations were applied from the bottom face. The intensities of the ultrasonic vibrations were 0.3 W/cm$^2$ in the hardening solution tank, 0.5 W/cm$^2$ in the drying tank and 0.8 W/cm$^2$ in the washing pretreatment tank.

Confronting high-pressure mercury lamps having an intensity of 80 W/cm were arranged as the ultraviolet ray-irradiating device 15 on the respective sides so that both the surfaces of shaped articles were irradiated.

Three secondary hangers 5, each hanging thereon six lenses of CR-39 [poly(allyl diglycol carbonate) resin] having a thickness of 2 mm and an outer diameter of 75 mm, were held on the primary hanger 4 of the first chain conveyor 1. The lenses were subjected to the washing and drying treatments and then were dip-coated with the hardening solution. In each of the drying tank and hardening solution tank, the lenses were pulled up at 0.5 cm/sec by the lifting device 40 so that the residence time in the liquid was 15 seconds. The three secondary hangers 5 were shifted one by one from the first conveyor 1 to the second conveyor 3 moving at a moving speed of 4.0 cm/sec through the intermediate conveyor 2, and the lenses were then irradiated with ultraviolet rays while the distance between the mercury lamp and the CR-39 lens was adjusted to 200 mm. The atmosphere temperature of the hardening solution tank was 25° C. and the relative humidity was 50% (the dew point=13.9° C.). The periods of from completion of the coating operation to the point of start of irradiation with ultraviolet rays in the three secondary hangers were 1 minute and 18 seconds, 1 minute and 25 seconds, and 1 minute and 33 seconds, respectively. Each of the resulting surface-hardened CR-39 lenses was excellent in the smoothness, hardness and adhesion.

When the speed of the intermediate conveyor 2 was changed so that the periods of from the point of completion of the coating operation to the point of start of irradiation with ultraviolet rays were 42 seconds, 60 seconds, and 68 seconds, respectively. The lens hung on the first secondary hanger was inferior in the smoothness and had a relatively low hardness. When the above-mentioned periods were changed from 3 minutes to 3 minutes and 15 seconds, 5 minutes to 5 minutes and 30 seconds, and 10 minutes to 11 minutes and 30 seconds, respectively, an increase of spitting was observed on the surfaces of the lenses, and when the above period exceeded 10 minutes, no satisfactory product could be obtained. When the lenses were subjected to the cross-cut adhesion test using an adhesive cellophane tape, partial separation was observed.

What is claimed is:

1. A method for the surface-hardening treatment of a synthetic resin shaped article wherein a synthetic resin shaped article is dipped in a surface-hardening solution; the synthetic resin shaped article is gradually pulled up therefrom thereby being coated with the surface-hardening solution; and the coated shaped article is irradiated with ultraviolet rays to cure the coating, CHARACTERIZED IN THAT (a) the synthetic resin shaped article is dipped in succession in a washing pretreatment tank, a drying tank having warm water or an organic solvent and a hardening solution tank while the synthetic resin shaped article is conveyed by a first conveyor, and then, the synthetic resin shaped article is transferred from the first conveyor through an intermediate conveyor to a second conveyor whereby the synthetic resin shaped article is conveyed to an ultraviolet ray-curing step; (b) the synthetic resin shaped article is introduced to and withdrawn from the respective steps in the state where the synthetic resin shaped article is hung on a hanger, and one or a plurality of hangers are attached to each of a plurality of portions of the first conveyor so that the synthetic resin shaped articles are simultaneously subjected to the dipping treatment in the respective tanks, whereas the hangers are conveyed one by one from the intermediate conveyor to the second conveyor where the synthetic resin shaped articles are separately hung; (c) in each of the washing pretreatment tank, the drying tank comprising warm water or an organic solvent and the hardening solution tank, the liquid is overflowed therefrom and circulated via a filter to each tank; and (d) the surface-hardening treatment is carried out under such conditions that the surface-hardening solution in the hardening solution tank and the atmosphere above the hardening solution tank are maintained at room temperature and the dew point of said atmosphere is maintained at a level lower by at least 3° C. than the temperature of the surface-hardening solution.

2. A method according to claim 1, wherein in the hardening solution tank or both in the hardening solution tank and drying tank, the synthetic resin shaped article is pulled up by a lifting device to effect the dipping treatment.

3. A method according to claim 1, wherein the drying tank comprises warm water maintained at 30° C. to 80° C. or an organic solvent having boiling point of not higher than 100° C. under atmospheric pressure.

4. A method according to claim 1, wherein the temperature of the surface-hardening solution in the hardening solution tank is in the range of from 10° C. to 30° C.

5. A method according to claim 1, wherein the period of from the point of coating of the synthetic resin shaped article with the surface hardening solution to the point of irradiation of the synthetic resin shaped article with ultraviolet rays is in the range of from 30 seconds to 6 minutes.

6. A method according to claim 1, wherein the surface-hardening solution comprises an acrylic monomer as the main component.

7. An apparatus for the surface-hardening treatment of a synthetic resin shaped article by dipping a synthetic resin shaped article in a surface-hardening solution, gradually pulling up the synthetic resin shaped article to coat the surface of the synthetic resin shaped article with the surface-hardening solution, and irradiating the coated shaped article with ultraviolet rays to cure the coating, said apparatus comprising (a) a conveyor system including a first conveyor for conveying the synthetic resin shaped article in succession through a washing pretreatment tanks, a drying tank and a hardening solution tank to effect dipping in the respective tanks, a second conveyor for conveying the synthetic resin shaped article to an ultraviolet ray-curing device, and an intermediate conveyor for transferring secondary hangers each having the synthetic resin shaped article hung thereon from the first conveyor to the second conveyor; one or more of said secondary hangers each having the synthetic resin shaped article hung thereon being detachably attached to each of a plurality of primary hangers attached to the first conveyor; and said secondary hangers being conveyed separately and one by one from the first conveyor through the intermediate conveyor to the second conveyor whereby the secondary hangers are conveyed one by one to the ultraviolet ray-curing device; (b) pumps for circulating the liquids through pipe lines from the washing pretreatment tank, drying tank and hardening solution tank to the respective tanks, and filters arranged downstream of said pumps in the respective circulating pipe lines; (c) a device surrounding the respective conveyors, and the washing pretreatment tank, the drying tank, the hardening solution tank and the ultraviolet ray-curing device to define a substantially closed treating chamber; and (d) a device including an air feeder for feeding air into the treating chamber, a filter for removing dusts from the air in the treating chamber and a heat exchanger for adjusting the temperature and humidity of the air in the treating chamber.

8. An apparatus according to claim 7, wherein the hardening solution tank or both the hardening solution tank and drying tank are provided with a lifting device or devices for moving up the primary hanger having one or a plurality of secondary hangers for holding the synthetic resin shaped article.

9. An apparatus according to claim 7, wherein a heat exchanger is provided in the circulating pipe line of the hardening solution tank or in the hardening solution tank to adjust the temperature of the surface hardening solution.

10. An apparatus according to claim 7, wherein a heat exchanger is provided in the circulating pipe line of the drying tank or in the drying tank to adjust the temperature of the liquid in the drying tank.

* * * * *